United States Patent [19]

Sturges et al.

[11] Patent Number: 4,674,609
[45] Date of Patent: Jun. 23, 1987

[54] TORSIONAL VIBRATION DAMPENING SYSTEM

[75] Inventors: Fred D. Sturges; Romas B. Spokas, both of Rockford, Ill.

[73] Assignee: Borg-Warner Corporation, Chicago, Ill.

[21] Appl. No.: 740,443

[22] Filed: Jun. 3, 1985

[51] Int. Cl.$^4$ .................... F16D 43/284; B60K 41/02
[52] U.S. Cl. ............................ 192/0.033; 192/0.076; 192/103 F
[58] Field of Search ............... 192/0.032, 0.033, 0.075, 192/0.076, 103 R, 109 F, 103 F; 361/242

[56] References Cited

U.S. PATENT DOCUMENTS

| | | | |
|---|---|---|---|
| 3,084,307 | 4/1963 | Landis | 361/242 X |
| 3,474,888 | 10/1969 | Carlson et al. | 192/91 A X |
| 4,142,619 | 3/1979 | Spokas | 192/113 B |
| 4,280,608 | 7/1981 | Labuda et al. | 192/113 B |
| 4,377,222 | 3/1983 | Sommer | 192/0.032 X |
| 4,428,467 | 1/1984 | Hiramatsu | 192/3.31 |
| 4,457,411 | 7/1984 | Hiramatsu | 192/0.076 |
| 4,466,311 | 8/1984 | Hiramatsu | 74/866 |
| 4,468,988 | 9/1984 | Hiramatsu | 74/868 |
| 4,529,072 | 7/1985 | Oguma et al. | 192/0.076 X |
| 4,560,047 | 12/1985 | McCarthy et al. | 192/109 F X |

Primary Examiner—Rodney M. Bonck
Assistant Examiner—David A. Testardi
Attorney, Agent, or Firm—James E. Tracy

[57] ABSTRACT

The transmission of torsional vibrations from a rotating driving shaft, at the output of an internal combustion engine, to a driven shaft, at the input of a manual transmission, are reduced or eliminated by employing a normally-engaged, oil-cooled wet clutch to interconnect the two shafts, the clutch being controlled to introduce a desired amount of slippage. Slipping the wet clutch to a relatively small extent allows the necessary torque to be transmitted, but any torque fluctuations in the driving shaft will be effectively absorbed and prevented from causing torsional vibrations in the drivetrain.

1 Claim, 1 Drawing Figure

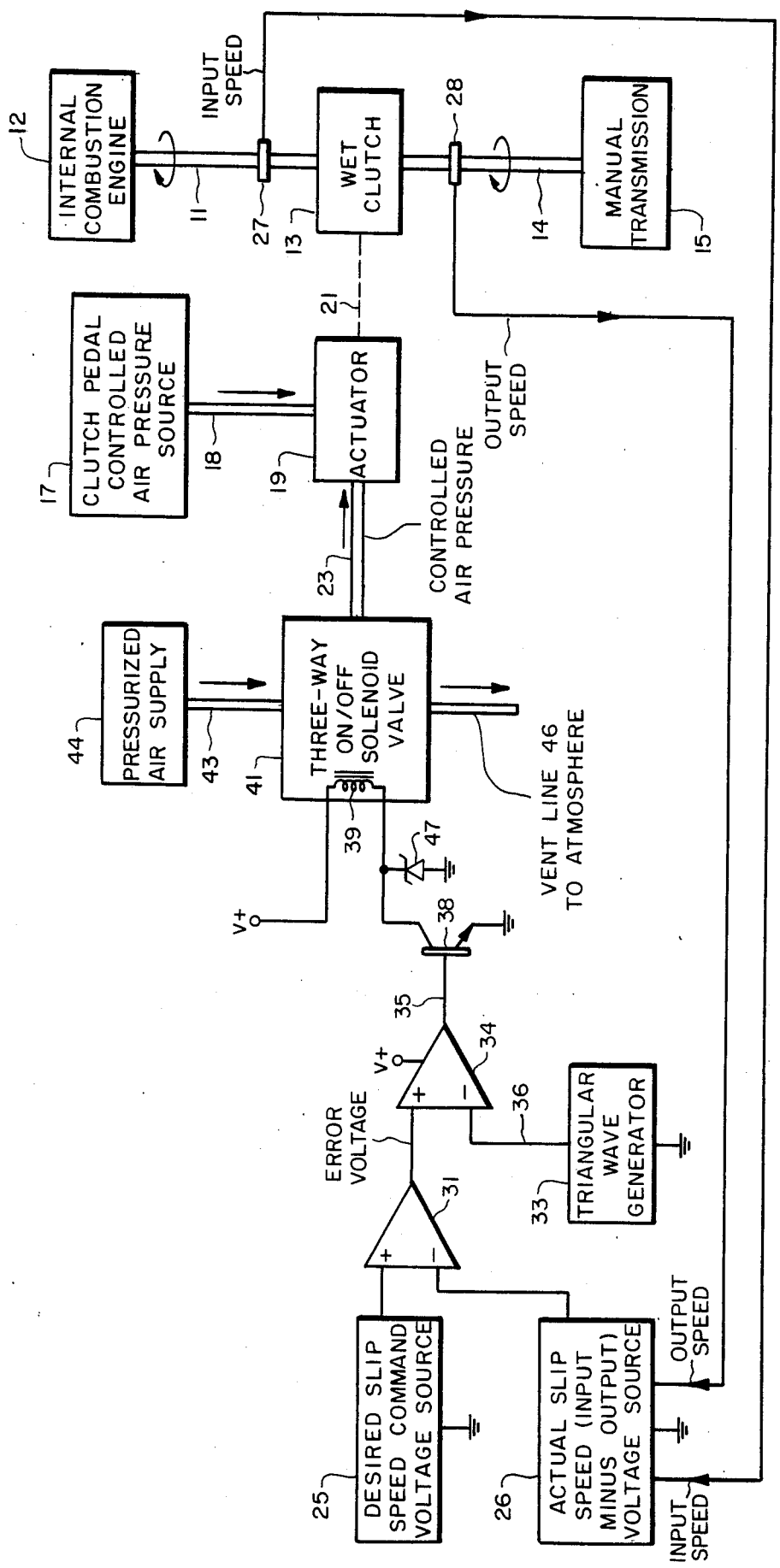

4,674,609

TORSIONAL VIBRATION DAMPENING SYSTEM

BACKGROUND OF THE INVENTION

This invention relates to a torque transmitting system for transmitting torque in a drivetrain from a rotating driving shaft, at the output of an internal combustion engine, to a driven shaft, at the input of a manual transmission, without transferring torque fluctuations in the driving shaft, thereby precluding the development of torsional vibrations in the drivetrain that may otherwise be caused by the torque fluctuations.

The driving torque, produced by the output driving shaft (namely, the crankshaft) of an internal combustion engine, fluctuates or pulsates due to the operation of the pistons in the engine. Such a pulsating torque becomes more pronounced as modifications are made in internal combustion engines to permit those engines to operate at lower rotational speeds (RPM's), to achieve greater fuel economy, but yet at higher torque levels to maintain horsepower ratings. The higher torque levels require that each piston in the engine contribute a larger force each time its cylinder fires. The power produced by each stroke of the engine must be greater. These larger forces from the pistons are transmitted to the crankshaft, resulting in substantial torque fluctuations in the engine crankshaft output. Each time a cylinder fires, the torque sharply varies or fluctuates. The pulsating torque can resonate in the drivetrain creating torsional vibrations that may cause significant problems, such as reduced lifetimes for gears, bearings, shafts, splines, universal joints, differentials, etc.

Torsional dampener systems have been developed in the past for reducing torsional vibrations in drivetrains having manual transmissions, such as in trucks, but all of these prior systems have certain disadvantages, for example, high cost, large space requirements, complexity of construction, unreliability, inefficiency, and short operating life. In contrast, the torsional vibration dampening system of the present invention exhibits none of these disadvantages and instead provides a unique system of relatively simple and inexpensive construction, requiring no significant space, having a long lifetime, and being highly reliable and efficient in operation.

SUMMARY OF THE INVENTION

The invention provides a torque transmitting system for transmitting torque in a drivetrain from a rotating driving shaft, at the output of an internal combustion engine, to a driven shaft, which connects to the input of a ratio changing means such as a manual transmission, without transmitting torque fluctuations in the driving shaft. The system comprises a normally-engaged, oil-cooled wet clutch interposed between and normally interconnecting the driving and driven shafts and providing the only means for transferring torque from the rotating driving shaft to the driven shaft. The drivetrain is interrupted when the wet clutch is released and the driving and driven shafts are completely disconnected from each other. Control means, operable when the wet clutch is engaged, are provided for causing the clutch to slip by a preselected desired amount in order to prevent the transfer to the driven shaft of any torque fluctuations in the driving shaft, thereby precluding the creation of torsional vibrations in the drivetrain.

DESCRIPTION OF THE DRAWING

The features of the invention which are believed to be novel are set forth with particularity in the appended claims. The invention may best be understood, however, by reference to the following description in conjunction with the accompanying drawing which schematically illustrates a torque transmitting system, constructed in accordance with the invention, for transmitting torque from the output of an internal combustion engine to the input of a manual transmission.

DESCRIPTION OF THE ILLUSTRATED EMBODIMENT

Referring to the drawing, the crankshaft output 11 (which serves as the driving shaft) of internal combusion engine 12 connects, via normally-engaged, oil-cooled wet clutch 13, to the driven shaft 14 at the input of manual transmission 15. Wet clutch 13 is of conventional construction, oil being circulated through the clutch facings to carry away and dissipate heat and create an oil film between the facing and mating surfaces to reduce wear. In well-known manner, the clutch discs are normally engaged, by means of springs that clamp the discs together, so that the rotating driving shaft 11 effects rotation of driven shaft 14. In conventional fashion, when it is desired to shift gears in manual transmission 15, the truck driver (assuming the invention is incorporated in a truck) depresses a clutch pedal which controls a source of air pressure (see block 17 in the drawing) in order to deliver, via line 18, a predetermined fluid pressure (specifically air pressure) to actuator 19. The actuator is basically a pneumatic cylinder, having a diaphragm, which in response to the controlled air pressure in line 18 exerts a force on the release mechanism in clutch 13 to effect disengagement of the clutch discs. The release force overcomes the clamping force of the springs to separate the clutch discs from each other. This control of the release mechanism by actuator 19 is indicated by the dashed construction line 21.

As thus far described, the arrangment of elements 12–21 is entirely conventional and is particularly advantageous in a truck. The advantages of employing an oil-cooled wet clutch, rather than a dry clutch, are well known. One major advantage is that a wet clutch has a considerably longer life than a dry clutch. While actuator 19 is shown as being external to wet clutch 13, it may actually form part of the clutch. For example, the controlled fluid (air) pressure in line 18 could operate a piston in the wet clutch which in turn moves a clutch release lever to disengage the clutch. As will be appreciated, since elements 12–21 are already needed, relatively few and inexpensive additional elements are required to implement the invention and prevent the transmission to driven shaft 14 of any torque fluctuations in driving shaft 11. When the clutch is engaged, these additional elements will supply another controlled air pressure, over line 23, to actuator 19 to effect a slight movement of the clutch release mechanism to lessen the clamping force on the clutch discs to the extent that the clutch begins to slip, the amount of slippage being determined by the level of the controlled air pressure.

The desired slip is dictated by the level of the command voltage provided by source 25. This voltage may be produced by an adjustable voltage divider which is adjusted to establish a constant slip speed regardless of the rotational speed of driving shaft 11, or it may be developed by a speed-controlled circuit arrangement to provide different slip speeds at different shaft speeds. For example, if torsional vibrations are particularly high around one engine speed, source 25 may be programmed to command a higher desired slip at that engine speed.

Source 26 produces an actual slip speed voltage having an amplitude proportional to and representing the actual slip speed. This is achieved by sensing the input and output speeds of clutch 13, by means of sensors 27 and 28 which sense the rotational speeds of driving shaft 11 and driven shaft 14, respectively, and subtracting the output speed from the input speed. A wide variety of sensing arrangements exist that produce voltage signals proportional to shaft speeds. The voltage signals for the input and output speeds may then be subtracted in an analog amplifier. For example, input and output speed frequencies may be generated by sensors having multi-toothed wheels and magnetic pickups. The frequencies could be converted to voltages which are then subtracted to produce a voltage representing the actual slip speed. The input and output speed frequencies could also be mixed in a multiplier to develop sum and difference frequencies, the mixed signal then being filtered to obtain only the difference frequency representing the slip speed. This frequency can then be converted to a voltage.

One novel method of implementing source 26 to obtain an actual slip speed voltage is to match the speed related frequencies from sensors 27 and 28 rather than maintain a difference in frequencies. In particular, this can be accomplished by using toothed-wheel sensors having different numbers of pulse producing teeth on their toothed wheels. For example, if the input speed sensor 27 employs a 119 toothed wheel and the output speed sensor 28 uses a 120 toothed wheel, matching the frequencies results in a slip of 0.83% of input speed.

$$\left(1 - \frac{119}{120}\right) \times 100\% = 0.83\%$$

Hence, controlling the slip to obtain equal frequencies results in a fixed percentage slip.

Comparison circuit 31 compares the two voltages from sources 25 and 26 and produces an error voltage representing any error between the commanded and actual slip speeds. The error signal is in a feedback control loop which automatically controls the clutch slippage so that it is held at the desired value. Any deviation of the slip from the desired amount causes source 26 to output a different signal, whereupon the comparison circuit 31 changes the error voltage in the direction necessary to adjust the slip speed until the desired level is re-established.

To explain, triangular wave generator 33 and comparator 34 provide a pulse width modulation circuit for producing, on conductor 35, a signal having a pulse width modulated waveshape as determined by the amplitude of the error voltage. As is well understood, a pulse width modulated signal is rectangular shaped, containing periodically recurring positive-going pulse components with intervening negative-going pulse components. The frequency and period will be constant but the relative widths (connoting time durations) of the positive and negative pulse components will vary depending on the amplitude of the error signal, assuming that that amplitude level lies somewhere within the amplitude range over which the triangular shaped signal on conductor 36 varies. As the width or duration of each positive pulse component increases, each negative pulse component decreases proportionally, and vice versa. In other words, since the period or time duration of a complete cycle is constant, when the duration of a positive pulse component changes in one sense or direction, the width of the immediately succeeding negative pulse component must change in the opposite sense. The pulse width modulated signal has a duty cycle characteristic which is the ratio of the width of each positive-going pulse compared to the duration of a complete cycle.

Preferably, the frequency of the triangular shaped signal produced by generator 33 is around 20 hertz. In order to develop a pulse width modulated signal at the output of comparator 34, the triangular shaped voltage at the negative or inverting input of the comparator must vary alternately above and below the voltage level of the error signal at the comparator's positive or non-inverting input. Each time the alternating voltage at the negative input becomes less than (namely negative relative to) the voltage at the positive input, the output voltage of comparator 34 abruptly switches from ground or zero volts to V+, which may be +12 volts d-c if the system is included in a truck, where it remains until the triangular shaped voltage signal becomes greater than (namely becomes positive with respect to) the error voltage at the positive input. At that instant, the output voltage of the comparator switches from its high level (V+) back to its low level or zero. The larger the amplitude of the error signal at the positive input, the greater the time intervals during which the output of comparator 34 is established at its high potential level and the smaller the time intervals when the output is at zero potential, namely the greater the duty cycle. Hence the duty cycle of the pulse width modulated signal on conductor 35 is directly proportional to the error voltage.

The output signal on conductor 35 operates the driver, comprising transistor 38, to control the energization of the solenoid coil 39 which is included in the three-way on/off solenoid valve 41. When the output voltage of comparator 34 is high, transistor 38 conducts to energize coil 39, whereas when the output of the comparator is established at its low level, transistor 38 will be turned off and coil 39 will be de-energized. Valve 41 is of conventional construction and operates in well-known manner. It is normally closed so that when coil 39 is de-energized valve 41 is in its closed position wherein the inlet port (line 43) is closed off and outlet line 23 connects to the exhaust port (vent line 46). In this closed position, the fluid (if any) in line 23 will be exhausted and atmospheric pressure will be applied to actuator 19.

Energization of coil 39 shifts valve 41 to its open position wherein line 43, over which air pressure is delivered from pressurized air supply 44 to the inlet port of the valve, is connected to line 23 to supply the full air pressure to actuator 19. In the open position of valve 41, the exhaust orifice, which connects via vent line 46 to the atmosphere, is closed or sealed off.

Since a pulse width modulated signal is applied to the base of transistor 38, coil 39 will be alternately energized and de-energized to rapidly switch the valve 41 between pressure in and exhaust out, in accordance with the signal's duty cycle, to create a controlled fluid pressure, between those extremes, for application to actuator 19. The smaller the duty cycle, the shorter the energization of coil 39 during each cycle of the pulse width modulated signal, and the less the fluid (air) pressure applied to actuator 19. Hence, by increasing the duty cycle of the pulse width modulated signal on line 35, the energization time of coil 39 may be increased, causing the fluid pressure in line 23 to be increased. Diode 47 protects transistor 38 against inductive voltage spikes generated by coil 39 turning off.

Of course, while air pressure is employed in the illustrated embodiment to control the actuator 19, any pressurized fluid will suffice. For example, oil pressure may be used. Turning valve 41 on and off will still regulate the output pressure in line 23 at, or between, the pressure levels in lines 43 and 46.

In short, the pulse width modulation circuit develops, in response to the error voltage, a pulse width modulated signal on conductor 35 having a duty cycle which is directly proportional to the amplitude of the error voltage. Solenoid valve 41 is operated by the pulse width modulated signal to produce, in line 23, a controlled air pressure which is directly proportional to the duty cycle and the error signal. Hence, any time voltage source 25 outputs a different desired slip speed command voltage or any time the actual slip speed varies from the desired level, the error voltage changes and varies the air pressure in line 23 as necessary to establish the desired slip speed.

The invention provides, therefore, a torsional vibration dampening system for reducing the transmission of torsional vibrations in a drivetrain from a driving shaft, at the output of an internal combustion engine, and through an engaged, oil-cooled wet clutch to a driven shaft which connects to the input of a ratio changing means such as a manual transmission, where the wet clutch is the only means for transferring torque from the driving shaft to the driven shaft. When the wet clutch is engaged, actuator 19, in response to the air pressure in line 23, causes the clutch to slip in a controlled amount in order to absorb any torque fluctuations in the driving shaft, thereby to eliminate torsional vibrations in the drivetrain.

While particular embodiments of the invention have been described, modifications may be made, and it is intended in the appended claims to cover all such modifications as may fall within the true spirit and scope of the invention.

We claim:

1. A torque transmitting system for transmitting torque in a drivetrain from a rotating driving shaft, at the output of an internal combustion engine, to a driven shaft, which connects to the input of a manual transmission, without transmitting torque fluctuations in the driving shaft, comprising:

a normally-engaged, oil-cooled wet clutch interposed between and normally interconnecting the driving and driven shafts and providing the only means for transferring torque from the rotating driving shaft to the driven shaft, the drivetrain thereby being interrupted when the wet clutch is released and the driving and driven shafts are completely disconnected from each other to permit gear shifting in the manual transmission;

means for providing a desired slip speed command voltage having an amplitude proportional to and representing a desired slip speed between the driving and driven shafts;

input speed sensing means for sensing the rotational speed of the driving shaft;

output speed sensing means for sensing the rotational speed of the driven shaft;

means for responding to said input speed sensing means and to said output speed sensing means and effectively subtracting the rotational speed of the driven shaft from the rotational speed of the driving shaft to provide an actual slip speed voltage having an amplitude proportional to and representing the actual slip speed;

comparison means for comparing said desired slip speed voltage and said actual slip speed voltage to produce an error voltage representing any error between the commanded and the actual slip speeds;

a pulse width modulated circuit for developing, in response to said error voltage, a pulse width modulated signal having a duty cycle which is proportional to the amplitude of the error voltage;

a three-way on/off solenoid valve to which is supplied pressurized fluid and operated by the pulse width modulated signal to rapidly switch between pressure in and exhaust out to produce a controlled fluid pressure which is proportional to the duty cycle of the pulse width modulated signal;

and an actuator, responsive to the controlled fluid pressure, for applying a controlled release force to the wet clutch, when engaged, to cause the clutch to slip by a preselected desired amount in order to prevent the transfer to the driven shaft of any torque fluctuations in the driving shaft, thereby precluding the creation of torsional vibrations in the drivetrain, said actuator also receiving, and responding to another controlled fluid pressure to effect release and complete disengagement of the wet clutch when it is necessary to shift gears in the manual transmission.

* * * * *